Sept. 3, 1935. G. GORDON 2,013,559
METHOD OF SCANNING FOR TELEVISION PURPOSES AND APPARATUS THEREFOR
Filed Dec. 24, 1931 2 Sheets-Sheet 1
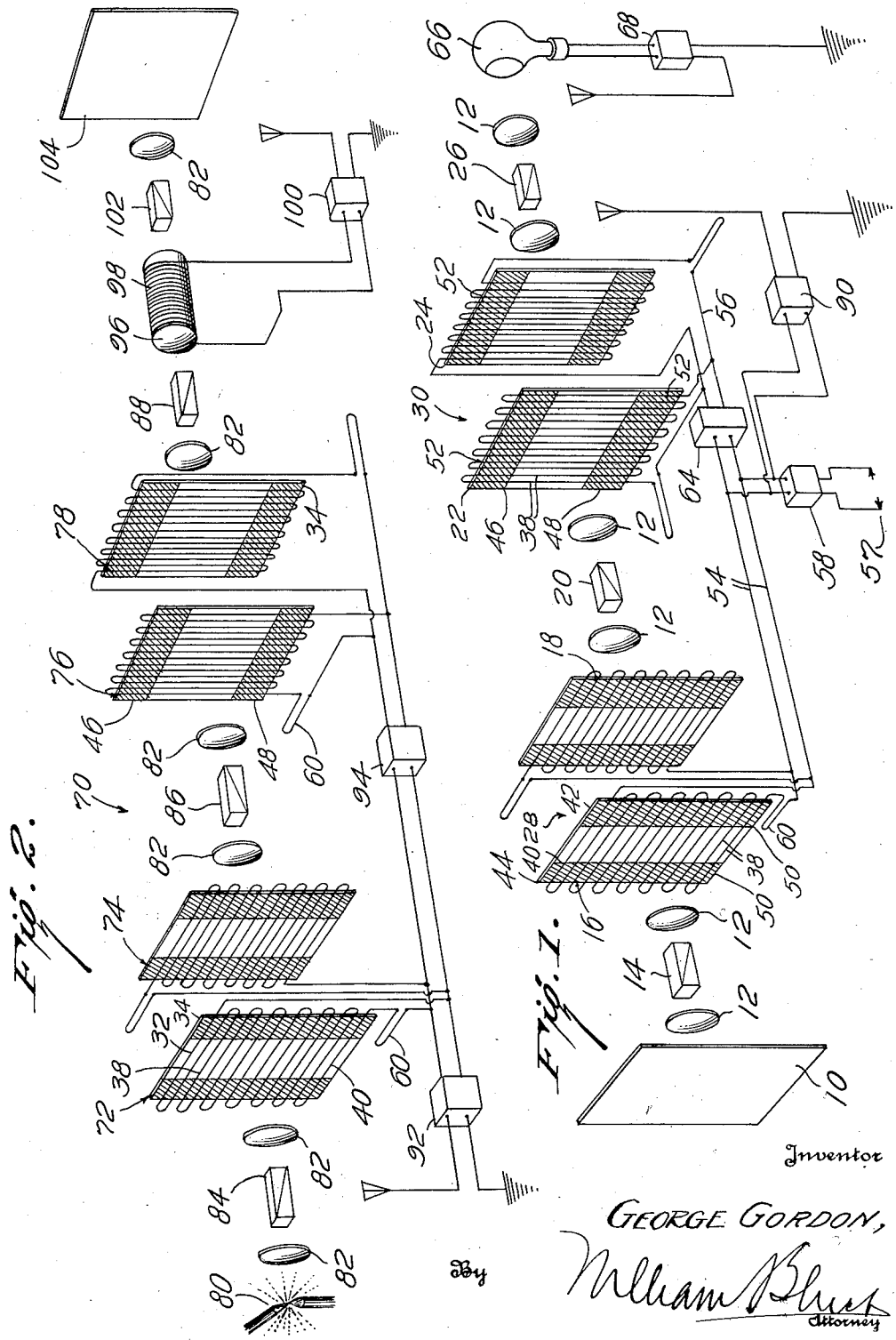

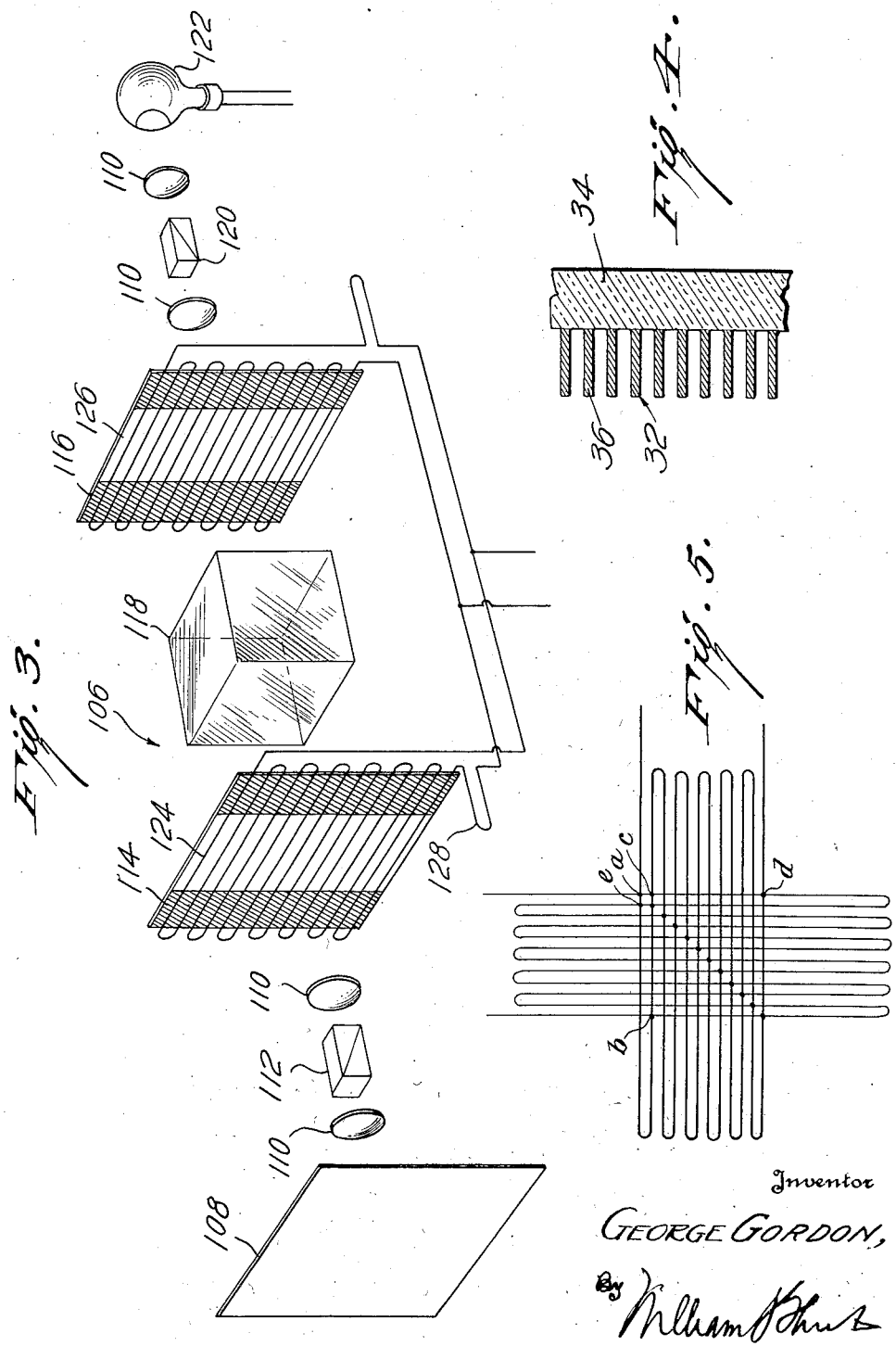

Patented Sept. 3, 1935

2,013,559

UNITED STATES PATENT OFFICE 2,013,559

METHOD OF SCANNING FOR TELEVISION PURPOSES AND APPARATUS THEREFOR

George Gordon, Harrington Park, N. J., assignor, by mesne assignments, to Mildred S. Reisman, New York, N. Y.

Application December 24, 1931, Serial No. 582,963

59 Claims. (Cl. 178—6)

This invention relates to a method of scanning for television purposes and to apparatus therefor.

The apparatus generally used and the methods employed for converting light rays emanating from a scene or object into electrical impulses, which may then be transmitted to a point removed from the position of such scene or object and there be reconstructed into a reproduction of the original scene or object, have generally involved the use of moving mechanical elements. For instance, the rotating scanning disk has been an essential feature of such apparatus, in almost all cases; in some cases, a vibrating mirror or like element has been introduced. In all of these cases, however, there has been involved a moving mechanical element, even though the movements of that element were controlled by an electrically operated member.

It is an object of the invention to provide television apparatus in which scansion and reconstruction are effected by electrical means having no moving parts. Particularly, the invention relates to the use of electro-magnetic effects upon light rays which have been plane polarized. The electromagnetic effects may be, and preferably are, produced by electric currents flowing through a plurality of conductors arranged transversely of the path of the light rays. As the currents pass through the rays, the magnetic fields thereby produced cause rotation of the rays at such portions as are directly affected by the conductors. By timing the passage of current through a pair of conductors, arranged in different planes transversely of the rays and at a predetermined angle to each other, and by blotting out, by suitable analyzing means, the rays not affected by the magnetic fields, the effect of a moving point of light is produced.

By making the charge of current passing through one conductor of sufficiently small extent, so that its effect would be little more than that of a point source, the other conductor may be dispensed with and substantially the same ends accomplished. However, since the creation of such small quantities of current requires very expensive apparatus, it is an object of the invention to provide a method of producing current effects in connection with polarized light such that it will be substantially the same as if a point source of current were acting upon the rays. For this purpose two conductors are arranged in parallel planes and transversely of the rays. The effective portions of the conductors in each plane are identical in their geometrical lay-out so that the same rays, affected by a portion of one conductor, will be affected by an identical portion of the conductor in the other plane. The conductors, however, are positioned and their connections are so arranged that current flow will be in opposite directions in the two conductors and will thereby produce oppositely effective magnetic fields. With the magnetic field around the first conductor equal and opposite to the field around the second conductor, and the field of the second conductor effective when rays affected by the field of the first conductor strike it, the rays, passing beyond the second conductor, will have been rotated equally in two different directions, and thus will have been returned to their original plane of polarization and pass from the conductors without change in their plane of polarization. However, if the rays affected by the magnetic field at one conductor should pass the other conductor without such conductor having affected the rays as they passed it, the rays passing beyond the two conductors will be in two planes of polarization. This effect may be produced by making current in one conductor lead or lag the current in the other conductor, and/or by properly spacing apart the planes of the respective conductors, whereby there will necessarily result, at least for a portion of the light affected by the conductors, a quantity unaffected by the re-rotating effect of the pair of conductors.

In either case, the rays passing the first conductor and affected by the field produced around it by the head of the current and then arriving at the second conductor before the head of current had entered the first effective portion, will pass the second conductor in the plane to which it has been rotated by the first conductor. In like manner, rays passing the first conductor after the tail of the charge has passed and, therefore, unaffected, and arriving at the second conductor in time to be affected by the tail of the current in that conductor, will pass that conductor rotated out of the original plane of polarization.

If an analyzer be positioned beyond the second conductor and be set to blot out light in the original plane of polarization, the rays which were not counter-rotated will pass the analyzer, the amount being determined by the lead or lag, and/or by the conductor plane spacing. The difference of lead or lag and/or conductor plane spacing may be adjusted so that, at the maximum, a bar is produced. By arranging a pair of sets of such related conductors, each pair including a pair of conductors exactly identical but the conductors of different pairs being disposed at sharp angles to, the conductors of the other set, and preferably at right angles, and thereafter producing the desired bars in two pairs, and, beyond the second pair, blotting out rays in the original plane of polarization and in the plane to which light is rotated by one only of the sets, there will result a moving point of light.

By using just two conductors, arranged in spaced apart, parallel planes, it is also possible to produce but one moving point of light. For this purpose, there is interposed between the two conductors a medium, such as quartz, having the effect of rotating polarized light oppositely to the direction of rotation effected by the current. The conductors are arranged in identical fashion; the current flows in exactly the same direction in each conductor. The quartz or like member is constructed so that light passed therethrough is rotated reversely twice as much as accomplished by one conductor. Then, when the light passes the second conductor, it is rotated in the original direction of rotation, and is brought back into the original plane of polarization. By properly spacing the planes of the two conductors, and/or by introducing suitable means for delaying the movement of current charge through one of the conductors, some of the rays affected by one conductor will not be affected by current at the other conductor. By producing a proper relationship of delay and/or conductor spacing, the amount of light thus affected by one conductor only may be controlled to produce substantially only a point of light which will move along as the two fronts or tails of the current stream move through the respective conductors. But a point of light will be passed by an analyzer, properly set, the point having the intensity due to substantially maximum rotation effected by a high current flow.

Other objects of this invention will hereinafter be set forth, or will be apparent from the description and the drawings, in which are illustrated a number of embodiments of apparatus for carrying out the invention.

The invention, however, is not intended to be restricted to any particular construction or arrangement of parts, or to any particular application of such constructions, or to any specific method of operation, or to any of the various steps or details thereof, herein shown and described, as the same may be modified, in various particulars, or be applied in many varied relations without departing from the spirit and scope of the claimed invention, the practical embodiments herein illustrated merely being to show some of the various forms and modifications in which the invention might be embodied.

For the attainment of these objects and of such other objects as may hereinafter appear or be pointed out, I have illustrated embodiments of my invention in the drawings, in which the same reference characters refer to the same parts throughout, and wherein:—

Fig. 1 is a diagrammatic view, in perspective, of a television transmitting system, embodying the invention;

Fig. 2 is a system, shown as in Fig. 1, embodying the principles of the invention into a receiving unit;

Fig. 3 is a view, similar to Fig. 1, of a system in accordance with the invention, but modified to use but a pair of screens;

Fig. 4 is a section through one of the screens, illustrating the arrangement of the conductors on, and their application to, the screns; and Fig. 5 is an elevational view, illustrating the movement of the dot where two bars are formed during the scanning operation.

To illustrate the invention, there have been diagrammatically shown on the drawings certain elements which, however, are to be considered only as disclosing an operative system. The elements are not to be understood in their specific character only, but rather in their generic relation. For instance, object 10 is intended to represent any object capable of being visualized by a scanning device, whether such object be a stationary one, or a scene of moving, or stationary, or a mixture of moving and stationary, objects. The optical system 12 is represented here by a plurality of lenses; its specific character, however, is not of material importance here as each system may require special design for particular purposes to which it is to be applied.

Rays from object 10, whether visible or of wave lengths beyond ordinary visibility, are directed by optical system 12 to a polarizer 14, the purpose of which is to change the character of the rays substantially to a state of plane polarization. The polarized rays are then directed through screens 16 and 18, an analyzer 20, screens 22 and 24, and then through analyzer 26. Between the respective screens may be positioned any desired elements of optical system 12, such elements being for such purposes as paralleling the rays or for otherwise making the system optically perfect.

Screens 16 and 18 form a set 28, while screens 22 and 24 form a set 30. Each of the screens is formed by means of a conductor 32, applied to the face of a plate 34 of light transmitting and refractive material. The conductor is applied to plate 34 in any desired form, but preferably, as shown, as a number of built-up projections 36 defining lines 38 crossing and recrossing the plate, which is disposed transversely of the direction of the rays. The lines of the conductors in the respective screens are in planes substantially parallel to each other. The effective portions 40 of the lines of the conductors in screen 16 are arranged in substantially the same relation to each other as those of the conductor on the plate of screen 18. By the effective portions are meant those portions of the conductor found between the boundary frames 42 and 44 of each screen which determine the portions of the conductor effective for scanning purposes. Upon screens 22 and 24 there are disposed frames 46 and 48 which, together with frames 42 and 44, determine the entire bounds of the picture scanned. It can readily be understood that frames 42 and 44 need be applied only to one of the screens to limit the scanning properties of the entire system. Likewise, frames 46 and 48 may be applied to either of screens 22 or 24, or may be split up between them.

The portions 50 and 52 of the conductors in the respective screens, masked at the frames 42, 44, 46 and 48, and the connections 54 and 56 to the respective screens are related so that current flow through any particular portion 40 will be exactly opposite in effect to the current flow through the corresponding effective portion in the other conductor.

A power source 57 is connected with these screens and, by means of a device 58, timed impulses of current are caused to flow through them.

Device 58 is, in effect, a suitable means for opening and closing the circuit at definite time intervals in order to produce pulses of current flowing through the screen. It may be of any desired construction, capable of converting current from a source, as, for instance, a battery or the like, into such series of impulses. Vacuum tubes may be used for this purpose. Each pulse is intended to be of sufficient length to cover the entire screen before it ceases.

Screens 16 and 18 are spaced apart a definite amount. When rays, travelling from object 10, pass screen 16, there ensues a definite time period before such light can arrive at screen 18. If current flow through the two screens were to commence simultaneously, the first rays affected by the current flowing through screen 18 would not have been affected by current at screen 16, while the first rays affected by the current flow at screen 16 would arrive at screen 18 to be affected by an energized conductor at that screen. The reverse situation would arise when current flow ceased. The rays affected by current in both screens would have been rotated in two directions by the two conductors. The conductors are balanced in such manner that the rotative effect of each conductor will be equal, although opposite. In other words, such rays, rotated by both screens, will have been returned to the original plane of polarization.

If analyzer 20 be set to refuse light in the original plane of polarization, it would deny not only all light passing the screens and unaffected thereby, but also light passing both screens and affected by both screens. The analyzer, however, would not refuse light rotated by one only of the screens. In other words, rays affected only by the head or tail of current in one of the screens would be passed by the analyzer.

In order to produce effective increased spacing of the screens without actually separating them to great extent, the lead-in for one screen may have introduced therein some circuit lengthening element 60 so that the current head for the conductor of that screen will be delayed in its effectiveness for a period behind that of the current in the other screen. By this means, the amount of light being passed by analyzer 20, at any particular time, may be varied. As a desirable form for this embodiment, the delay is limited to produce a bar of the length of one of the portions 40. It is to be noted that each of the portions 50 and 52 is substantially the length of an effective portion 40 so that there will be delay in these portions equal to the time necessary for current to travel the distance of a portion 40 before the head of the current commences to move through a next successive portion.

The screens of set 30 may be arranged in a manner similar to screens 16 and 18, except that their effect would be to produce a bar substantially at right angles to the bar of set 28. By properly relating these two bars, it is possible to produce a moving point of light passing analyzer 26. This analyzer could be operative to refuse polarized light in one or more planes of polarization. In the case of plural plane refusals, this analyzer would eliminate the necessity for analyzer 20. In any case, this analyzer would be set to refuse rays in the plane or planes to which it is rotated by set 28. The construction of this analyzer, for this purpose, may be of any desired type, consisting either of two or more analyzers, intercepting the rays in succession, or, in any other way, producing the result indicated.

The energization of set 30 is effected through a multiplier device 64, controlled from device 58 to pass through set 30 impulses to form bars for set 30 in a predetermined relation to the bars produced by set 28. For instance, an arrangement such as represented in Fig. 5 may be effected by such timing. The heavy lines are intended to represent the movement of the bar produced by set 28, while the light lines represent the bar formed by set 30. For this particular method of application, it is required that the same number of bars be formed vertically as horizontally. The timing in this particular case is such that, say, the vertical bars are commenced to be formed at a time interval equal to the time spacing of the horizontal bars plus the time it takes the front of the horizontal bar to move a distance equivalent to two effective portions. The timing of the horizontal bar is, in this case, made the time it takes it to move completely twice the length of all effective portions of a screen.

Now, if the formation of the two bars is commencing at point $a$, and the analyzers are properly arranged, the points on the diagonal from $a$ will successively be passed by the final analyzer as the bars move along, it being remembered that the portions 50 and 52 are equal in length to an effective portion 40. Now, when the next bar is formed by set 28, there is no corresponding vertical bar formed until the horizontal bar arrives at point $b$. Subsequently, dots are formed at the points on the long diagonal from point $c$. Thus, the formation of dots continues until dot $d$ is formed by the conjunction of bars. By tracing the relationship of timing, it will be seen that the vertical bar, after being effective to form dot $d$, will then coact with the next successive horizontal bar to form dots along the long diagonal from point $e$, and along the other diagonals in similar fashion.

Such points of light as are thus segregated from the original rays emanating from object 10 are directed upon the light sensitive portion of a cell 66. The circuit of this cell may be used to modulate the wave emitted by a transmitting apparatus 68, or it may be used in any other desired manner for transmitting impulses varying in accordance with light effects from object 10.

It is to be understood that the invention may also be applied in many other relations, as, for instance, where a light source is positioned in place of object 10 and, by means of the scanning apparatus, a point of light caused to flicker across a scene or object positioned in place of cell 66. Flickering light reflected from the object is used to affect one or more light cells arranged around the object.

Receiving apparatus 70 has screens 72 and 74, substantially identical with screens 16 and 18, and screens 76 and 78, substantially identical with screens 22 and 24. Light from a source 80 is directed by an optical system 82 upon a polarizer 84 for transmission past the screens, which are associated and assembled in the identical manner of the screens of Fig. 1. Analyzers 86 and 88, similar to like analyzers at the transmitter, are assembled with the screens. It is to be noted that the impulses, as determined by device 58, for the respective screens at the transmitter, must be timed so as to be the same as the impulses in screens 72, 74, 76 and 78. For this purpose, a transmitter 90 may be modulated to control the action of device 92 for energizing screens 72 and 74. A suitable multiplier 94 of the same character as multiplier 64 is used to control the timing of the impulses for screens 76 and 78. By this means, impulses exactly timed with the impulses in the transmitting station are sent through the respective receiving screens so that the point of light produced by this system will, at all times, be identically positioned with reference to the transmitted dot.

This moving point of light is then passed through a portion of refracting material 96 about which is wound a coil 98 receiving its energizing current from a receiving unit 100, tuned to the wave length of transmitter 68. This unit effects rotation of the rays passed by analyzer 88 in accordance with the intensity of the rays at the cell 66. By proper control of the current in coil 98, and the action of an analyzer 102 therewith associated, there will appear on screen 104 a dot moving exactly in synchronism with the dot produced at the transmitter and having an intensity proportionately the same as the same portion of the rays from object 10 determined by the dot so moving at the transmitter. By reason of the well known principle of persistence of vision, this moving dot of varying intensity will reconstruct for an observer the original scene in its various details.

The fineness of detail will be determined by the number of conductors 32 per inch of the surface of plate 24. This can be made very fine in character by forming fine line conductors, in one case, by electrically depositing upon the face of the plate, such conductors and building them up, as shown in Fig. 4, to reduce their electrical resistance. It is also contemplated to construct such screens by depositing a complete plating of metal, such as silver, upon the face of the plate and then, by a method similar to that used in making diffraction gratings, to remove lines of the applied metal and leave an extremely fine lined structure remaining. These lines may then be built up to any desired height to secure the required conductivity.

In Fig. 3, there has been shown substantially the same system as that of Fig. 1, except that, in this case, one of the sets 28 or 30 has been eliminated.

In this modification, the transmitting apparatus 106 includes an object 108, an optical system 110, a polarizer 112, and two screens 114 and 116, between which is interposed a quartz block 118. Beyond screen 116, is an analyzer 120 from which the rays pass to a light sensitive cell 122. In this arrangement, rays from the object are passed through the optical system and are polarized by member 112 before they are acted upon by screen 114. Screens 114 and 116 are exactly identical in their formation, that is, conductors 124 and 126 of the respective screens have exactly the same disposition so that rays, travelling from screen to screen, will be acted upon by exactly identical portions of the conductors. Also, current flows through similar portions of the conductors in exactly the same direction. Therefore, if current were initiated in the two conductors, and the same rays passing the first conductor were affected at the second conductor by the same current, the plane of polarization of such light rays would be rotated twice as far as would result from the operation of one screen.

However, the quartz block 118 interposed between the two screens is ground so that it will rotate the light, coming from screen 114, reversely of the direction of rotation effected by said screen, and twice the amount of such screen rotation. In other words when light has passed from screen 114 through block 118 and then is affected by screen 116, the net result would be to return the light to the original plane of polarization. An analyzer set to refuse light in the original plane of polarization would thereby debar light acted upon by the two screens and the block. By properly spacing apart the two screens, or by lengthening the path of current for one of the screens, and preferably for screen 114 by an element 128, or by both methods conjunctively, the rays affected by one screen may be made different in part from those affected by the other screen. This difference may be adjusted so that, at any particular instant, it would amount to but little more than a dot and, in fact, can be closely controlled to form but a dot. As can be seen, as the current heads move through the two screens, this dot will move transversely of the rays being scanned and will affect cell 122 continuously, but entirely in accordance with the intensity of the dot at each distinct instant. The intensity of the dot will correspond to the intensity of the rays emanating from a corresponding part of the image and, therefore, the electrical impulses will correspond to the intensity of light at a particular portion of the object.

It will be obvious that while I have shown the screens 114 and 116 with boundary frames corresponding to the portions 42 and 44 of screen 28 of Figure 1, such frames are unnecessary in this form of the invention and all portions of conductors 124 and 126 may be located within the luminous field. Nor again it is necessary that the magnitudes of the currents in the two screens be identical, since the twisting action of the block and of the analyzer may be relatively set to secure the desired effect with other current value.

In reception, substantially the same arrangement as shown in Fig. 2 will be used, except that, instead of two sets of screens, only one set of screens with their conductors arranged, and with a quartz block interposed, exactly as in Fig. 3, will be necessary.

Many other changes could be effected in the particular apparatus designed, and in the methods of operation set forth, and in the various specific steps or details thereof, without substantially departing from the invention hereof, which is intended to be defined in the accompanying claims, the specific description herein being merely illustrative of operative embodiments carrying out the spirit of the invention.

Having thus described my invention and illustrated its use, what I claim as new and desire to secure by Letters Patent is—

1. In a method of converting the radiant energy rays, emitted from a source, into electrical energy pulsations for reconversion into radiant energy rays in a manner to reconstitute the appearance of the original source, the steps of: polarizing radiant energy rays, subjecting the polarized rays to the magneto-optical action of a magnetic field moving transversely of the rays, and immediately thereafter subjecting a portion of the magnetically affected rays to the magneto-optical action of a second magnetic field moving along a parallel path such as to affect the identical rays to the same degree but in opposite manner so that rays affected by the first field would be returned to their original state by the second field, the two fields being of such extent and so timed in their movement that at least a portion of the rays affected by one field will be unaffected by the other field.

2. In a method of converting the radiant energy rays, emitted from a source, into electrical energy pulsations for reconversion into radiant energy rays in a manner to reconstitute the appearance of the original source, the steps of: polarizing the radiant energy rays, subjecting a portion of the polarized rays to the magneto-optical effects of a magnetic field moving transversely and unidirectionally across said portion of the polarized rays, immediately thereafter subjecting a portion of the magnetically affected rays to the magneto-optical effects of a second magnetic field moving along a path such as to affect the identical rays to the same degree but in opposite manner so that rays affected by the first field would be returned to their original state by the second field, the two fields being of such extent and so timed in their movement that at least a portion of the rays affected by one field will be unaffected by the other field, and then eliminating one of the sets of rays.

3. In a method of converting the radiant energy rays, emitted from a source, into electrical energy pulsations for reconversion into radiant energy rays in a manner to reconstitute the appearance of the original source, the steps of: polarizing the radiant energy rays, subjecting the polarized rays to the magneto-optical action of a magnetic field moving transversely of the rays, immediately thereafter subjecting a portion of the magnetically affected rays to the magneto-optical action of a second magnetic field moving along a parallel path such as to affect the identical rays to the same degree but in opposite manner so that rays affected by the first field would be returned to their original state by the second field, the two fields being of such extent and so timed in their movement that at least a portion of the rays affected by one field will be unaffected by the other field, and then analyzing the rays to leave only one of the sets of rays.

4. In a method of converting the radiant energy rays emitted from a source into electrical energy pulsations for reconversion into radiant energy rays in a manner to reconstitute the appearance of the original source, the steps of: polarizing radiant energy rays, subjecting the polarized rays to the magneto-optical action of a unidirectional magnetic field moving transversely of the rays, immediately thereafter subjecting a portion of the magnetically affected rays to a second magnetic field moving along a path such as to affect the identical rays to the same degree but in opposite manner so that rays affected by the first field would be returned to their original state by the second field, the two fields being of such extent and so timed in their movement that at least a portion of the rays affected by one field will be unaffected by the other field, and then analyzing the rays to leave only the rays not in the original plane of polarization.

5. For use in a system of scanning for television purposes: a plurality of distinct means for producing distinct magneto-optically active magnetic fields moving in parallel paths, said means being each interposed in the path of the energy rays dissipated from a scene or object to affect such rays successively, the rays being substantially in a uniform state of polarization before being acted upon by the magnetic fields, the magneto-optically active magnetic fields produced by successive means being related to act upon substantially identical rays and being of such extent that the effect of one field will be nullified by the next field, the fields being of sufficient extent and so timed that at least a portion of the rays affected by one field will not be nullified by the other, thereby permitting rays of two classes to pass such fields, that is, rays in the original polarized state, and rays the state of which has been changed by the action of at least one field, and an analyzer set to refuse one of the sets of rays.

6. In a system of scanning for television purposes: a plurality of distinct means for producing distinct magneto-optically active magnetic fields moving in parallel paths in opposite directions, said means being each interposed in the path of the energy rays dissipated from a scene or object to affect such rays successively, the rays being substantially in a uniformly polarized state before being acted upon by the magnetic fields, the magnetic fields produced by successive means being related to act upon substantially identical rays and being of such extent that the effect of one field will be nullified by the next field, the fields being of sufficient extent and so timed that at least a portion of the rays affected by one field will not be nullified by the other, thereby permitting rays of two classes to pass such fields, that is, rays in the original polarized state and rays the state of which has been changed by the action of at least one field, and an analyzer set to refuse rays in the original polarized state.

7. In a system of scanning for television purposes: a plurality of electric conductors interposed in the path of uniformly polarized light rays dissipated from a scene or object to affect such rays successively and associated with a birefringent element in the path of said rays, the conductors extending transversely of the direction of the rays and successive conductors being in parallel separated relation to each other and adapted to carry currents to rotate the plane of polarization of the polarized light by the magneto-optical action thereof, the successive conductors being related to act upon substantially identical rays and the currents in such successive conductors being of such strength that the rotative effect of one will be nullified by the next, the currents being of sufficient extent and so timed that at least a portion of the rays affected by one conductor will not be nullified by the other.

8. In a system of scanning for television purposes: a plurality of electric conductors adapted to carry electric currents and each arranged in a plane extending transversely of the path of uniformly polarized light rays dissipated from a scene or object, and each associated with a birefringent element in the path of said rays, so as to affect such rays successively by the magneto-optical effect of the currents carried thereby, the planes being in parallel separated relation, the successive conductors being related so that the currents therein act upon substantially identical rays and the currents in such successive conductors being unidirectional in relation to the conductor and being on the plane of polarization of the rays of such strength that the rotative effect of one will be nullified by the next, the currents being of sufficient extent and so timed that at least a portion of the rays affected by one conductor will not be nullified by the other.

9. In a system of scanning for television purposes: a plurality of electric conductors adapted to carry electric currents and each arranged in a plane extending transversely of the path of uniformly polarized light rays dissipated from a scene or object, and each associated with a birefringent element in the path of said rays, so as to affect such rays successively by the magneto-optical effect of the currents carried thereby, the planes being in parallel separated relation and the conductors in successive planes being arranged according to a substantially operatively identical pattern, the successive conductors being related so that the currents therein act upon substantially identical rays and the currents in such successive conductors being unidirectional in relation to the conductor and being of such strength that the rotative effect on the plane of polarization of the rays of one will be nullified by the next, the currents being of sufficient extent and so timed that at least a portion of the rays affected by one conductor will not be nullified by the other.

10. In a system of scanning for television purposes: a plurality of electric conductors adapted to carry electric currents and each arranged in a plane extending transversely of the path of uniformly polarized light rays dissipated from a scene or object, and each associated with a birefringent element in the path of said rays, so as to affect such rays successively by the magneto-optical effect of the current carried thereby, the planes being in parallel spaced relation and the conductors in successive planes being arranged in parallel relation and according to a substantially identical pattern, the currents in such successive conductors being of such strength that the rotative effect on the plane of polarization of the rays of one will be nullified by the next, the currents being of sufficient extent and so timed that at least a portion of the rays affected by one conductor will not be nullified by the other.

11. In a system of scanning for television purposes: a plurality of electric conductors adapted to carry electric currents and each arranged in a plane extending transversely of the path of uniformly polarized light rays dissipated from a scene or object, and each associated with a birefringent element in the path of said rays, so as to affect such rays successively by the magneto-optical effect of the currents carried thereby, the planes being in parallel spaced relation and the conductors in successive planes being arranged in parallel relation and according to a substantially identical pattern, corresponding portions of successive patterns being related with the direction of the rays so that the currents therein act upon identical rays, and means for passing current through the conductors in such manner that the magnetic fields produced by the currents of successive conductors will act upon the polarized light to neutralize their effect, the currents being of sufficient extent and so timed and the planes being spaced so that at least a portion of the rays affected by one conductor will not be nullified by the other.

12. In a system of scanning for television purposes: a plurality of electric conductors adapted to carry electric currents and each arranged in a plane extending transversely of the path of uniformly polarized light rays dissipated from a scene or object, and each associated with a birefringent element in the path of said rays, so as to affect such rays successively by the magneto-optical effect of the currents carried thereby, the planes being in parallel spaced relation and the conductors in successive planes being arranged according to a substantially identical pattern, corresponding conductors in each pattern being parallel and similarly connected, corresponding portions of successive patterns being related with the direction of the rays so that the currents therein act upon identical rays, and means for passing current through the conductors in such manner that the magnetic fields produced by the currents of successive conductors will act upon the polarized light to neutralize their effect, the flow of current in successive conductors being controlled so that at least a portion of the rays affected by current in one conductor will not be nullified by the current in the other.

13. In a system of scanning for television purposes, which includes: a plurality of electric conductors adapted to carry electric currents and each arranged in a plane extending transversely of the path of uniformly polarized light rays dissipated from a scene or object and each associated with a birefringent element in the path of said rays, so as to affect such rays successively by the magneto-optical effect of the currents carried thereby, the planes being in parallel spaced relation and the conductors in successive planes being arranged according to a substantially identical pattern, corresponding portions of successive patterns being related with the direction of the rays so that the currents therein act upon identical rays, means for passing similar unidirectional currents through the conductors in such manner that the magnetic fields due to the currents of successive conductors will act upon the polarized light to neutralize their effect, and means for timing the initiation of flow of current in successive conductors so that at least a portion of the rays affected by current in one conductor will not be nullified by the current in the other.

14. Television apparatus, including means for polarizing rays to be scanned, a pair of conductors each associated with a birefringent element and arranged transversely in the path of the rays, the conductors being arranged according to a substantially identical pattern so that all substantially identical portions will be equally spaced apart in the direction of the rays to be scanned, and means for causing similar electric current impulses to pass through the two conductors in such timed relation that the magnetic effects of the one current impulse only will be active upon some of the rays, and means for imparting to all of the rays reverse rotation equivalent to the action of both conductors.

15. Television apparatus, including means for polarizing rays to be scanned, a pair of conductors each associated with a birefringent element and arranged transversely in the path of the rays to be scanned, the conductors being arranged according to a substantially identical pattern so that all substantially identical portions will be equally spaced apart in the direction of the rays to be scanned, and, means for causing similar electric current impulses to pass through the two conductors, the two conductors being spaced apart and the current impulses having magnetic effects of the same strength upon the rays and being so timed that at least a portion of the rays affected by one conductor will be unaffected by the other, and means between the two conductors for imparting to the rays twice the effect of the conductors but in the reverse direction.

16. In the art of television, the method of scanning which comprises the steps of plane polarizing the field of light rays proceeding from the subject to be reproduced so that all of the rays are polarized in the same plane, subjecting said field of rays to the twisting action on their plane of polarization of a magneto-optically active wave traveling through said field in a predetermined path located in a plane substantially perpendicular to the direction of said rays, subjecting a portion of said twisted rays to the twisting action of a second magneto-optically active wave of similar form to said first wave and travelling along a predetermined path parallel point for point to said first-mentioned path, but timed so that the rays twisted by the head portion of said first wave will pass through unaffected, and subjecting said field of rays to the action of filtering means adapted to obstruct the passage of the doubly twisted rays, but permitting the passage of the singly twisted rays, and thereafter receiving and converting said singly twisted rays in a means for converting light rays into electric impulses for transmission to a reproducing apparatus.

17. In a method of television scanning as in claim 16, in which the magneto-optically active waves are flat-topped.

18. In a method of television scanning as in claim 16, in which the magneto-optically active waves are flat-topped and of the same amplitude.

19. In a method of television scanning as in claim 16, in which the magneto-optically active waves are caused to travel in opposite directions along parallel paths.

20. In a method of television scanning as in claim 16 in which the magneto-optically active waves are caused to travel in the same direction along parallel paths.

21. In the art of television, the method of image composition which comprises the steps of plane polarizing a field of light rays proceeding from a source of light so that all of the rays are polarized in the same plane, subjecting said field of rays to the twisting action on their plane of polarization of a magneto-optically active wave travelling through said field in a predetermined path located in a plane substantially perpendicular to the direction of said rays, subjecting a portion of said twisted rays to the twisting action of a second magneto-optical wave of similar form to said first wave and traveling along a predetermined path parallel point for point to said first-mentioned path, but timed so that the rays twisted by the head portion of said first wave will pass through unaffected, and subjecting said field of rays to the action of filtering means adapted to obstruct the passage of the doubly twisted rays, but permitting the passage of the singly twisted rays and modifying the intensity of said singly twisted rays by electrical impulses received from a transmitting station.

22. In a method of television image composition as in claim 21 in which the magneto-optically active waves are flat-topped.

23. In a method of television image composition as in claim 21 in which the magneto-optically active waves are flat-topped and of the same amplitude.

24. In a method of television, image composition as in claim 21, in which the magneto-optically active waves are caused to travel in opposite directions along parallel paths.

25. In a method of television, image composition as in claim 21, in which the magneto-optically active waves are caused to travel in the same direction along parallel paths.

26. In the art of television, the method of scanning as defined in claim 16, in combination with the method of image composition which comprises the steps of plane polarizing a field of light rays proceeding from a source of light so that all of the rays are polarized in the same plane, subjecting said field of rays to the twisting action on their plane of polarization of a magneto-optically active wave travelling through said field in a predetermined path located in a plane substantially perpendicular to the direction of said rays, subjecting a portion of said twisted rays to the twisting action of a second magneto-optical wave of similar form to said first wave and travelling along a predetermined path parallel point for point to said first-mentioned path, but timed so that the rays twisted by the head portion of said first wave will pass through unaffected, and subjecting said field of rays to the action of filtering means adapted to obstruct the passage of the doubly twisted rays, but permitting the passage of the singly twisted rays and modifying the intensity of said singly twisted rays by electrical impulses received from a transmitting station, said methods being coordinated by synchronization of the scanning with the image composition, both as to position and intensity.

27. In the art of television, the method of scanning which comprises the steps of plane polarizing the field of light rays proceeding from the subject to be reproduced so that all of the rays are polarized in the same plane, subjecting said field of rays to the twisting action on their plane of polarization of a magneto-optically active wave traveling through said field in a predetermined path located in a plane substantially perpendicular to the direction of said rays, subjecting a portion of said twisted rays to the twisting action of a second magneto-optically active wave of similar form to said first wave and travelling along a predetermined path parallel point for point to said first-mentioned path in the opposite direction to said first wave and timed so that the rays twisted by the head portion of said first wave will pass through unaffected, and subjecting said field of rays to the action of a filter adapted to obstruct the passage of the doubly twisted rays, but permitting the passage of the singly twisted rays, thereafter subjecting said field of rays to the twisting action of a second pair of magneto-optically active waves similar in characteristics and application to the first-mentioned pair, except that their direction of travel is perpendicular to that of the first pair, subjecting said field of rays to the action of a second filter adapted to transmit only singly twisted rays, and receiving said rays singly twisted by the second set of waves in a means for converting light rays into electric impulses, for transmission to a receiving station.

28. In the art of television, the method of scanning as defined in claim 27, in which the waves of each pair are flat-topped and of the same amplitude, whereby rays twisted by both waves of a pair have their planes of polarization restored to the initial state.

29. In the art of television, the method of image composition which comprises the steps of plane polarizing a field of light rays proceeding from a source of light so that all of the rays are polarized in the same plane, subjecting said field of rays to the twisting action on their plane of polarization of a magneto-optically active wave traveling through said field in a predetermined path located in a plane substantially perpendicular to the direction of said rays, subjecting a portion of said twisted rays to the twisting action of a second magneto-optically active wave of similar form to said first wave and traveling along a predetermined path parallel point for point to said first-mentioned path in a direction opposite to that of said first wave and timed so that the rays twisted by the head portion of said first wave will pass through unaffected, and subjecting said field of rays to the action of a filter adapted to obstruct the passage of the doubly twisted rays, but permitting the passage of the singly twisted rays, thereafter subjecting said field of rays to the twisting action of a second pair of magneto-optically active waves similar in characteristics and application to the first-mentioned pair, except that their direction of travel is perpendicular to that of the first pair, subjecting said field of rays to the action of a second filter adapted to transmit only singly twisted rays, and modifying the intensity of said singly twisted rays by electrical impulses received from a transmitting station.

30. In the art of television, the method of image composition as defined in claim 29 in which the waves of each pair are flat-topped and of the same amplitude, whereby rays twisted by both waves of a pair have their planes of polarization restored to the initial state.

31. In the art of television, the method of scanning as defined in claim 27, in combination with the method of image composition which comprises the steps of plane polarizing a field of light rays proceeding from a source of light so that all of the rays are polarized in the same place, subjecting said field of rays to the twisting action on their plane of polarization of a magneto-optically active wave travelling through said field in a predetermined path located in a plane substantially perpendicular to the direction of said rays, subjecting a portion of said twisted rays to the twisting action of a second magneto-optically active wave of similar form to said first wave and travelling along a predetermined path parallel point for point to said first-mentioned path in a direction opposite to that of said first wave and timed so that the rays twisted by the head portion of said first wave will pass through unaffected, and subjecting said field of rays to the action of a filter adapted to obstruct the passage of the doubly twisted rays, but permitting the passage of the singly twisted rays, thereafter subjecting said field of rays to the twisting action of a second pair of magneto-optically active waves similar in characteristics and application to the first-mentioned pair, except that their direction of travel is perpendicular to that of the first pair, subjecting said field of rays to the action of a second filter adapted to transmit only singly twisted rays, and modifying the intensity of said singly twisted rays by electrical impulses received from a transmitting station, said methods being coordinated by synchronization of the scanning with the image composition, both as to position and intensity.

32. In an electro-optical television system, scanning apparatus for breaking up the light rays comprising the luminous field proceeding from the subject into portions successively active on means for receiving said rays and converting them into electrical impulses for transmission to a receiving station, said apparatus comprising means in the path of the rays proceeding from the object for rendering them parallel and for uniformly plane polarizing them, means for twisting the plane of polarization of said rays by magneto-optical action, said means including two similar networks of parallel conductors, each network covering the field of rays and disposed in a plane substantially perpendicular to the advancing rays and forming a continuous path for an electric current, and means for causing the passage through said networks of electrical impulses of such magnitude and in such phase relation that as such impulse advances through the field, each of the consecutive portions of said rays constituting the field will be first twisted by only one of said impulses and then twisted by both, means for obstructing the passage of the doubly twisted rays and permitting passage of the singly twisted rays, means for receiving said singly twisted rays and converting them into electrical impulses, and means for transmitting said electrical impulses to a receiving station for purposes of image composition.

33. In an electro-optical television system, apparatus as in claim 32 in which the means for causing passage of electrical impulses is adapted to deliver flat-topped current waves.

34. In an electro-optical television system, apparatus as in claim 32, in which the means for causing passage of electrical impulses is adapted to deliver flat-topped current waves of the same amplitude.

35. In an electro-optical television system, apparatus as in claim 32 in which the means for causing passage of electrical impulses is adapted to cause travel of said impulses in the same direction through both networks.

36. In an electro-optical television system, apparatus as in claim 32 in which the means for causing passage of electrical impulses is adapted to cause travel of said impulses in opposite directions in corresponding portions of the two networks.

37. In an electro-optical television system, scanning apparatus for breaking up the light rays comprising a luminous field proceeding from the subject into portions successively active on means for receiving said rays and converting them into electrical impulses, said apparatus comprising means in the path of the rays proceeding from the object for rendering them parallel and for uniformly plane polarizing them, means for twisting the plane of polarization of said rays by magneto-optical action, said means including two similar networks of parallel conductors, each network covering the field of rays and disposed in a plane substantially perpendicular to the advancing rays and forming a continuous path for an electric current, and means for causing the passage through said networks of electrical impulses of such magnitude and in such phase relation that as such impulse advances through the field, each of the consecutive portions of said rays constituting the field will be first twisted by only one of said impulses and then twisted by both, filter means for obstructing the passage of the doubly twisted rays and permitting passage of the singly twisted rays, a second means for twisting the plane of polarization of light rays by magneto-optical action, similar to the first twisting means, but in which the currents travel in a direction at right angles to those of the first twisting means, a second filter means for obstructing rays doubly twisted and permitting passage of rays singly twisted by said second system, means for receiving said singly twisted rays and converting them into electrical impulses, and means for transmitting said electrical impulses to a receiving station for purposes of image composition.

38. In an electro-optical television system, image composition apparatus for breaking up the light rays comprising the luminous field proceeding from a source of light, said apparatus comprising means in the path of the rays proceeding from said source for rendering them parallel and for uniformly plane polarizing them, means for twisting the plane of polarization of said rays by magneto-optical action, said means including two similar networks of parallel conductors, each network covering the field of rays and disposed in a plane substantially perpendicular to the advancing rays and forming a continuous path for an electric current, and means for causing the passage through said networks of electrical impulses of such magnitude and in such phase relation that consecutive portions of said rays constituting the field will be consecutively twisted by only one of said impulses and then twisted by both, means for preventing the passage of the doubly twisted rays and permitting passage of the singly twisted rays, and means for modulating the intensity of the singly twisted rays in synchronism with electric impulses received from the transmitting station and corresponding to singly twisted rays similarly positioned within the image field.

39. In an electro-optical television system, apparatus as in claim 38, in which the means for causing passage of electrical impulses is adapted to deliver flat-topped current waves.

40. In an electro-optical television system, apparatus as in claim 38, in which the means for causing passage of electrical impulses is adapted to deliver flat-topped current waves of the same amplitude.

41. In an electro-optical television system, apparatus as in claim 38, in which the means for causing passage of electrical impulses is adapted to cause travel of said impulses in the same direction through both networks.

42. In an electro-optical television system, apparatus as in claim 38, in which the means for causing passage of electrical impulses is adapted to cause travel of said impulses in opposite directions in corresponding portions of the two networks.

43. In an electro-optical television system, image composition apparatus for breaking up the light rays comprising the luminous field proceeding from a source of light, said apparatus comprising means in the path of the rays proceeding from said source for rendering them parallel and for uniformly plane polarizing them, means for twisting the plane of polarization of said rays by magneto-optical action, said means including two similar networks of parallel conductors, each network covering the field of rays and disposed in a plane substantially perpendicular to the advancing rays and forming a continuous path for an electric current, and means for causing the passage through said networks of electrical impulses of such magnitude and in such phase relation that as such impulse advances through the field, each of the consecutive portions of said rays constituting the field will be first twisted by only one of said impulses and then twisted by both, filter means for obstructing the passage of the doubly twisted rays and permitting passage of the singly twisted rays, a second means for twisting the plane of polarization of light rays by magneto-optical action, similar to the first twisting means, but in which the currents travel in a direction at right angles to those of the first twisting means, a second filter means for obstructing rays doubly twisted and permitting passage of rays singly twisted by said second system, and means for modulating the intensity of the singly twisted rays in synchronism with electric impulses received from the transmitting station and corresponding to singly twisted rays similarly positioned within the image field.

44. In television scanning apparatus as defined in claim 37, in which the means for causing passage of electrical impulses is adapted to deliver flat-topped current waves.

45. In television scanning apparatus as defined in claim 37, in which the means for causing passage of electrical impulses is adapted to deliver flat-topped current waves of the same amplitude.

46. In television scanning apparatus as defined in claim 37 in which the means associated with each pair of networks for causing passage of electrical impulses therethrough, is adapted to cause travel of said impulses in opposite directions through both networks of each pair.

47. In television scanning apparatus as defined in claim 37 in which the means associated with each pair of networks for causing passage of electrical impulses therethrough, is adapted to cause travel of said impulses in the same direction through the networks of each pair.

48. In television image composition apparatus as defined in claim 43, in which the means for causing passage of electrical impulses is adapted to deliver flat-topped current waves.

49. In television image composition apparatus as defined in claim 43 in which the means for causing passage of electrical impulses is adapted to deliver flat-topped current waves of the same amplitude.

50. In television image composition apparatus as defined in claim 43 in which the means associated with each pair of networks for causing passage of electrical impulses therethrough is adapted to cause travel of said impulses in opposite directions through both networks of each pair.

51. In television image composition apparatus as defined in claim 43, in which the means associated with each pair of networks for causing passage of electrical impulses therethrough, is adapted to cause travel of said impulses in the same direction through the networks of each pair.

52. In the art of television the method of scanning as defined in claim 16, in combination with the method of image composition which comprises the steps of plane polarizing a field of light rays proceeding from a source of light so that all of the rays are polarized in the same plane, subjecting said field of rays to the twisting action on their plane of polarization of a magneto-optically active wave travelling through said field in a predetermined path located in a plane substantially perpendicular to the direction of said rays, subjecting a portion of said twisted rays to the twisting action of a second magneto-optical wave of similar form to said first wave and travelling along a predetermined path parallel point for point to said first-mentioned path, but timed so that the rays twisted by the head portion of said first wave will pass through unaffected, and subjecting said field of rays to the action of filtering means adapted to obstruct the passage of the doubly twisted rays, but permitting the passage of the singly twisted rays and modifying the intensity of said singly twisted rays by electrical impulses received from a transmitting station, the magneto-optically active waves used in scanning as well as in image composition being caused to travel in opposite direction along parallel paths, and said methods being coordinated by synchronization of the scanning with the image composition, both as to position and intensity.

53. In the art of television the method of scanning as defined in claim 16, in combination with the method of image composition which comprises the steps of plane polarizing a field of light rays proceeding from a source of light so that all of the rays are polarized in the same plane, subjecting said field of rays to the twisting action on their plane of polarization of a magneto-optically active wave travelling through said field in a predetermined path located in a plane substantially perpendicular to the direction of said rays, subjecting a portion of said twisted rays to the twisting action of a second magneto-optical wave of similar form to said first wave and travelling along a predetermined path parallel point for point to said first-mentioned path, but timed so that the rays twisted by the head portion of said first wave will pass through unaffected, and subjecting said field of rays to the action of filtering means adapted to obstruct the passage of the doubly twisted rays, but permitting the passage of the singly twisted rays and modifying the intensity of said singly twisted rays by electrical impulses received from a transmitting station, the magneto-optically active waves used in scanning as well as in image composition being caused to travel in the same directions along parallel paths, and said methods being coordinated by synchronization of the scanning with the image composition, both as to position and intensity.

54. In the art of television, a method of scanning as defined in claim 27, in which the waves of each pair are flat topped and of the same amplitude, whereby rays twisted by both waves of the pair have their planes of polarization restored to the initial state, in combination with the method of image composition which comprises the steps of plane polarizing a field of light rays proceeding from a source of light so that all of the rays are polarized in the same plane, subjecting said field of rays to the twisting action on their plane of polarization of a magneto-optically active wave travelling through said field in a predetermined path located in a plane substantially perpendicular to the direction of said rays, subjecting a portion of said twisted rays to the twisting action of a second magneto-optically active wave of similar form to said first wave and travelling along a predetermined path parallel point for point to said first-mentioned path in a direction opposite to that of said first wave and timed so that the rays twisted by the head portion of said first wave will pass through unaffected, and subjecting said field of rays to the action of a filter adapted to obstruct the passage of the doubly twisted rays, but permitting the passage of the singly twisted rays, thereafter subjecting said field of rays to the twisting action of a second pair of magneto-optically active waves similar in characteristics and application to the first-mentioned pair, except that their direction of travel is perpendicular to that of the first pair, subjecting said field of rays to the action of a second filter adapted to transmit only singly twisted rays, and modifying the intensity of said singly twisted rays by electrical impulses received from a transmitting station, and in which method of image composition the waves of each pair are flat topped and of the same amplitude, whereby rays twisted by both waves of the pair have their planes of polarization restored to the initial state, said methods being coordinated by synchronization of the scanning with the image composition both as to position and intensity.

55. A television system comprising a scanning system as defined in claim 37 in combination with an image composition system which comprises means in the path of the rays proceeding from said source for rendering them parallel and for uniformly plane polarizing them, means for twisting the plane of polarization of said rays by magneto-optical action, said means including two similar networks of parallel conductors, each network covering the field of rays and disposed in a plane substantially perpendicular to the advancing rays and forming a continuous path for an electric current, and means for causing the passage through said networks of electric impulses of such magnitude and in such phase relation that as such impulse advances through the field, each of the consecutive portions of said rays constituting the field will be first twisted by only one of said impulses and then twisted by both, filter means for obstructing the passage of the doubly twisted rays and permitting passage of the singly twisted rays, a second means for twisting the plane of polarization of light rays by magneto-optical action, similar to the first twisting means, but in which the currents travel in a direction at right angles to those of the first twisting means, a second filter means for obstructing rays doubly twisted and permitting passage of rays singly twisted by said second system, and means for modulating the intensity of the singly twisted rays in synchronism with electric impulses received from the transmitting station and corresponding to singly twisted rays similarly positioned within the image field.

56. A television system comprising a scanning system as defined in claim 37 in which the means for causing electrical impulses is adapted to deliver flat topped current waves, in combination with an image composition system comprising means in the path of the rays proceeding from said source for rendering them parallel and for uniformly plane polarizing them, means for twisting the plane of polarization of said rays by magneto-optical action, said means including two similar networks of parallel conductors, each network covering the field of rays and disposed in a plane substantially perpendicular to the advancing rays and forming a continuous path for an electric current, and means for causing the passage through said networks of electric impulses of such magnitude and in such phase relation that as such impulse advances through the field, each of the consecutive portions of said rays constituting the field will be first twisted by only one of said impulses and then twisted by both, filter means for obstructing the passage of the doubly twisted rays and permitting passage of the singly twisted rays, a second means for twisting the plane of polarization of light rays by magneto-optical action, similar to the first twisting means, but in which the currents travel in a direction at right angles to those of the first twisting means, a second filter means for obstructing rays doubly twisted and permitting passage of rays singly twisted by said second system, and means for modulating the intensity of the singly twisted rays in synchronism with electric impulses received from the transmitting station and corresponding to singly twisted rays similarly positioned within the image field, and in which image composition system the means for causing passage of electrical impulses is adapted to deliver flat topped current waves.

57. A television system comprising a scanning system as defined in claim 37, in which the means for causing electrical impulses is adapted to deliver flat topped current waves, of the same amplitude in combination with an image composition system comprising means in the path of the rays proceeding from said source for rendering them parallel and for uniformly plane polarizing them, means for twisting the plane of polarization of said rays by magneto-optical action, said means including two similar networks of parallel conductors, each network covering the field of rays and disposed in a plane substantially perpendicular to the advancing rays and forming a continuous path for an electric current, and means for causing the passage through said networks of electrical impulses of such magnitude and in such phase relation that as such impulse advances through the field, each of the consecutive portions of said rays constituting the field will be first twisted by only one of said impulses and then twisted by both, filter means for obstructing the passage of the doubly twisted rays and permitting passage of the singly twisted rays, a second means for twisting the plane of polarization of light rays by magneto-optical action, similar to the first twisting means, but in which the currents travel in a direction at right angles to those of the first twisting means, a second filter means for obstructing rays doubly twisted and permitting passage of rays singly twisted by said second system and means for modulating the intensity of the singly twisted rays in synchronism with electric impulses received from the transmitting station and corresponding to singly twisted rays similarly positioned within the image field, and in which image composition system the means for causing passage of electrical impulses is adapted to deliver flat topped current waves of the same amplitude.

58. A television system comprising a scanning system as defined in claim 37 in which the means associated with each pair of networks for causing passage of electrical impulses therethrough, is adapted to cause travel of said impulses in opposite directions through both networks of each pair, in combination with an image composition system comprising means in the path of the rays proceeding from said source for rendering them parallel and for uniformly plane polarizing them, means for twisting the plane of polarization of said rays by magneto-optical action, said means including two similar networks of parallel conductors, each network covering the field of rays and disposed in a plane substantially perpendicular to the advancing rays and forming a continuous path for an electric current, and means for causing the passage through said networks of electric impulses of such magnitude and in such phase relation that as such impulse advances through the field, each of the consecutive portions of said rays constituting the field will be first twisted by only one of said impulses and then twisted by both, filter means for obstructing the passage of the doubly twisted rays and permitting passage of the singly twisted rays, a second means for twisting the plane of polarization of light rays by magneto-optical action, similar to the first twisting means, but in which the currents travel in a direction at right angles to those of the first twisting means, a second filter means for obstructing rays doubly twisted and permitting passage of rays singly twisted by said second system, and means for modulating the intensity of the singly twisted rays in synchronism with electric impulses received from the transmitting station and corresponding to singly twisted rays similarly positioned within the image field, and in which image composition system the means associated with each pair of networks for causing passage of electrical impulses therethrough, is adapted to cause travel of said impulses in opposite directions through both networks of each pair.

59. A television system comprising a scanning system as defined in claim 37 in which the means associated with each pair of networks for causing passage of electrical impulses therethrough, is adapted to cause travel of said impulses in the same direction through both networks of each pair, in combination with an image composition system comprising means in the path of the rays proceeding from said source for rendering them parallel and for uniformly plane polarizing them, means for twisting the plane of polarization of said rays by magneto-optical action, said means including two similar networks of parallel conductors, each network covering the field of rays and disposed in a plane substantially perpendicular to the advancing rays and forming a continuous path for an electric current, and means for causing the passage through said networks of electrical impulses of such magnitude and in such phase relation that as such impulse advances through the field, each of the consecutive portions of said rays constituting the field will be first twisted by only one of said impulses and then twisted by both, filter means for obstructing the passage of the doubly twisted rays and permitting passage of the singly twisted rays, a second means for twisting the plane of polarization of light rays by magneto-optical action, similar to the first twisting means, but in which the currents travel in a direction at right angles to those of the first twisting means, a second filter means for obstructing rays doubly twisted and permitting passage of rays singly twisted by said second system, and means for modulating the intensity of the singly twisted rays in synchronism with electric impulses received from the transmitting station and corresponding to singly twisted rays similarly positioned within the image field, and in which image composition system the means associated with each pair of networks for causing passage of electrical impulses therethrough, is adapted to cause travel of said impulses in the same direction through both networks of each pair.

GEORGE GORDON.